United States Patent
Yamaguchi et al.

(10) Patent No.: US 7,213,665 B2
(45) Date of Patent: May 8, 2007

(54) HYBRID VEHICLE AND CONTROL METHOD OF SAME

(75) Inventors: Katsuhiko Yamaguchi, Nissin (JP); Osamu Harada, Toyota (JP); Yukio Kobayashi, Kasugai (JP); Kiyoshiro Ueoka, Nissin (JP); Takahiro Nishigaki, Nissin (JP); Mamoru Tomatsuri, Toyota (JP); Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 150 days.

(21) Appl. No.: 10/648,392

(22) Filed: Aug. 27, 2003

(65) Prior Publication Data

US 2004/0045753 A1  Mar. 11, 2004

(30) Foreign Application Priority Data

Sep. 10, 2002 (JP) .............................. 2002-264037
Apr. 18, 2003 (JP) .............................. 2003-114240

(51) Int. Cl.
*B60K 6/00* (2006.01)

(52) U.S. Cl. ...................... 180/65.2; 180/65.3; 701/22

(58) Field of Classification Search .................... None
See application file for complete search history.

(56) References Cited

U.S. PATENT DOCUMENTS

| | | | |
|---|---|---|---|
| 5,884,597 A * | 3/1999 | Hiraku et al. | 123/179.17 |
| 5,979,158 A | 11/1999 | Kaiser et al. | |
| 6,019,183 A * | 2/2000 | Shimasaki et al. | 180/165 |
| 6,026,921 A * | 2/2000 | Aoyama et al. | 180/65.2 |
| 6,247,437 B1 * | 6/2001 | Yamaguchi et al. | 123/179.3 |
| 6,253,866 B1 * | 7/2001 | Kojima | 180/65.2 |
| 6,358,180 B1 | 3/2002 | Kuroda et al. | |
| 6,581,705 B2 * | 6/2003 | Phillips et al. | 180/65.2 |
| 6,810,977 B2 * | 11/2004 | Suzuki | 180/65.2 |
| 2001/0032621 A1 | 10/2001 | Kojima et al. | |
| 2002/0043410 A1 | 4/2002 | Suzuki | |

FOREIGN PATENT DOCUMENTS

| | | |
|---|---|---|
| EP | 0 729 858 A1 | 9/1996 |
| EP | 1 199 206 A2 | 5/2002 |
| EP | 1 223 323 A2 | 7/2002 |
| JP | 05-328526 A | 10/1993 |
| JP | A 05-328526 | 12/1993 |
| JP | 09-286245 A | 11/1997 |
| JP | A 2000-350310 | 12/2000 |
| JP | A 2001-173479 | 6/2001 |
| JP | 2002-122061 A | 4/2002 |

* cited by examiner

OTHER PUBLICATIONS

Japanese Office Actions dated Jun. 22, 2004 and Sep. 6, 2005 with partial translation thereof.

*Primary Examiner*—Christopher Bottorff
(74) *Attorney, Agent, or Firm*—Kenyon & Kenyon LLP (57) ABSTRACT

A delay time for delaying starting of an internal combustion engine in a hybrid vehicle is set to a predetermined time based on an engine coolant temperature and a state of an air conditioner switch. Starting of the engine is delayed for the predetermined time if it is determined that a vehicle can run using only a motor based on a required torque, a required power and an SOC of the battery. The predetermined time is determined based on a time necessary for completing preheating of an engine by a preheating device, preparations of sensors such as an air-furl ratio sensor, and warming-up of an exhaust gas purifying device. As a result, it is possible to efficiently perform start of the engine and operation immediately after the engine start, and to make control at the engine start time simple.

10 Claims, 6 Drawing Sheets

HYBRID VEHICLE AND CONTROL METHOD OF SAME

INCORPORATION BY REFERENCE

The disclosures of Japanese Patent Application Nos. 2002-264037 filed on Sep. 10, 2002 and 2003-114240 filed on Apr. 18, 2003, each including the specification, drawings and abstract are incorporated herein by reference in their entireties.

BACKGROUND OF THE INVENTION

1. Field of the Invention

The invention relates to a hybrid vehicle. More particularly, the invention relates to a hybrid vehicle including an internal combustion engine; a motor which can output power to a driving shaft coupled with an axle; and electric power storage means for storing electric power obtained by converting at least part of power from the internal combustion engine to electric power, and for supplying the electric power to the motor.

2. Description of the Related Art

As a hybrid vehicle of the above-mentioned type, Japanese Patent Laid-Open Publication No. 5-328526 discloses a hybrid vehicle which starts running by a motor using electric power supplied from a battery immediately after a start key is turned to an ON position. In the hybrid vehicle, an engine for electric power generation is then started when a temperature of a catalyst of an exhaust purifying device is increased to a predetermined temperature by a heater. In the hybrid vehicle, the engine is started after the temperature of the catalyst of the exhaust purifying device becomes a temperature at which the catalyst functions properly, so as to appropriately purify exhaust gas during engine start.

Generally, a hybrid vehicle includes a motor which can output power for running, and a secondary battery which supplies electric power to the motor. Accordingly, it is not necessary to start the internal combustion engine immediately after a start key is turned to an ON position. Therefore, it is proposed to make preparations for the start of the internal combustion engine (herein after, referred to as the "engine start") so as to efficiently operate the internal combustion engine, and so as to make the exhaust gas clean during engine start. From this point of view, the applicant proposes a hybrid vehicle in which heat of an internal combustion engine during operation is stored, and the internal combustion engine is warmed up during the engine start using the stored heat (refer Japanese Patent Laid-Open Publication No. 2002-12206). The applicant also proposes a hybrid vehicle in which ON/OFF states of a controller and an inverter, whether to activate a motor, an ON/OFF state of an oil pump, and the like are set based on a position of a start key (refer to Japanese Patent Laid-Open Publication No. 9-286245).

SUMMARY OF THE INVENTION

It is an object of the invention to provide a hybrid vehicle which can be controlled easily even when there are a plurality devices which need to be prepared for an engine start.

According to a first aspect of the invention, a hybrid vehicle includes an internal combustion engine, a motor which can output power to a driving shaft coupled with an axle, and an electric power storage device for storing electric power that is obtained by converting at least part of power from the internal combustion engine to electric power, and for supplying the electric power to the motor. The hybrid vehicle is provided with a required driving force setting controller; and a start time controller. The required driving force setting controller sets a required driving force required for running according to an operation by a driver. The start time controlling controller starts the internal combustion engine after a predetermined time has elapsed since an instruction for starting the vehicle is given by an operator, when the instruction for starting the vehicle is given in the case where the required driving force set by the required driving force setting controller is equal to or smaller than a predetermined driving force and the vehicle can run using only the motor.

In the hybrid vehicle according to the invention, the internal combustion engine is started after the predetermined time has elapsed since the instruction for starting the vehicle is given when the required driving force is equal to or smaller than the predetermined driving force and the vehicle can run using only the motor. When the predetermined time is set to a time necessary for completing preparations of plural devices used for the engine start, it is possible to determine whether the preparations of the devices have been completed only based on whether the predetermined time has elapsed. It is not necessary to determine whether the preparations of the plural devices have been completed. Accordingly, even when the number of devices which need to be prepared for the engine start increases, it is possible to make the control during the engine start simple. When the required driving force exceeds the predetermined driving force or when the vehicle cannot run using only the motor, it is possible to start the internal combustion engine before the predetermined time elapses, so as to obtain the required driving force or so as to make the vehicle run with reliability. Various devices need to be prepared for the engine start. The various devices include a device for warming up the internal combustion engine, a sensor used for the operation of the internal combustion engine, and a device for warming up an exhaust gas purifying device which purifies the exhaust gas released from the internal combustion engine. In order to enable the vehicle to run using only the motor, it is necessary that the amount of electric power stored in the electric power storage means be equal to or larger than a predetermined value, that the circuit for controlling driving of the motor function properly, and the like.

The hybrid vehicle according to the invention may include temperature detecting controller for detecting a temperature of coolant for the internal combustion engine (hereinafter, referred to as an "engine coolant temperature"), and delay time setting controller for setting a delay time based on the detected temperature so as to delay the engine start. The start time controller may start the internal combustion engine using the delay time set by the delay time setting controller as the predetermined time. Thus, it is possible to start the internal combustion engine using the delay time based on the engine coolant temperature as the predetermined time. The engine coolant temperature is determined based on a time which has elapsed since the operation of the internal combustion engine is stopped and an outside air temperature. Accordingly, it is possible to start the internal combustion engine after a time, which corresponds to the state of the internal combustion engine and the outside air temperature, has elapsed.

In the hybrid vehicle according to an aspect of the invention, in which the delay time is used as the predetermined time, the delay time setting controller may set the delay time to be shorter as the detected temperature is lower.

Thus, as the engine coolant temperature is lower, the internal combustion engine is started in a shorter time after the instruction for starting the vehicle is given. Accordingly, even when sufficient electric power cannot be supplied from the electric power storage means to the motor until the predetermined time elapses due to a low outside air temperature, it is possible to start the internal combustion engine in a short time.

In the hybrid vehicle according to an aspect of the invention, in which the delay time is used as the predetermined time, the delay time setting controller may set the delay time based on the driving state of an air-conditioning device provided in the vehicle compartment. Thus, it is possible to start the internal combustion engine after a time, which corresponds to the driving state of the air-conditioning device, has elapsed. Namely, even when sufficient electric power cannot be supplied from the electric power storage means to the motor due to the driving of the air-conditioning device until the predetermined time has elapsed, it is possible to start the internal combustion engine in a short time.

In the hybrid vehicle according to the invention, the start time controller may start the internal combustion engine when the predetermined time has elapsed since the instruction for starting the vehicle is given. Thus, in the normal engine start in which the required driving force is equal to or smaller than the predetermined driving force and the vehicle can run using only the motor, the internal combustion engine is started when the predetermined time has elapsed since the instruction for starting the vehicle is given. Accordingly, it is possible to reduce the driver's discomfort due to a change in the timing of starting the internal combustion engine.

In the hybrid vehicle according to the invention, the predetermined time may be longer than a preparation time which is necessary to enable the sensor used for the operation of the internal combustion engine to function properly. Thus, it is possible to appropriately perform the engine start and the operation immediately after the engine start.

The hybrid vehicle according to the invention may include preheating controller for storing heat generated by the internal combustion engine during operation and for preheating the internal combustion engine using the stored heat during engine start. The predetermined time may be longer than a time necessary for completing preheating of the internal combustion engine by the preheating controller. Thus, it is possible to warm up the internal combustion engine promptly immediately after the engine start. As a result, fuel economy can be enhanced and the emission can be reduced.

In the hybrid vehicle according to the invention, the internal combustion engine may be connected to the driving shaft so as to be able to output power thereto.

According to a second aspect of the invention, a hybrid vehicle includes an internal combustion engine, a motor which can output power to a driving shaft coupled with an axle, and electric power storage means for storing electric power that is obtained by converting at least part of power from the internal combustion engine to electric power, and for supplying the electric power to the motor. The hybrid vehicle is provided with required driving force setting means; and start time controlling means. The required driving force setting means sets a required driving force required for running according to an operation by a driver. The start time controlling means starts the internal combustion engine after a predetermined time has elapsed since an instruction for starting the vehicle is given by an operator, when the instruction for starting the vehicle is given in the case where the required driving force set by the required driving force setting means is equal to or smaller than a predetermined driving force and the vehicle can run using only the motor.

According to a third aspect of the invention, a control method of a hybrid vehicle includes an internal combustion engine; a motor which can output power to a driving shaft coupled with an axle, and an electric power storage device which can store electric power obtained by converting at least part of power from the internal combustion engine to electric power, and which can supply the electric power to the motor, comprising the steps of: setting a required driving force required for running according to an operation of a driver; and starting the internal combustion engine after a predetermined time has elapsed since an instruction for starting the vehicle is given when the instruction is given by an operator in a case where the required driving force is equal to or smaller than a predetermined driving force and the vehicle can run using only the motor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
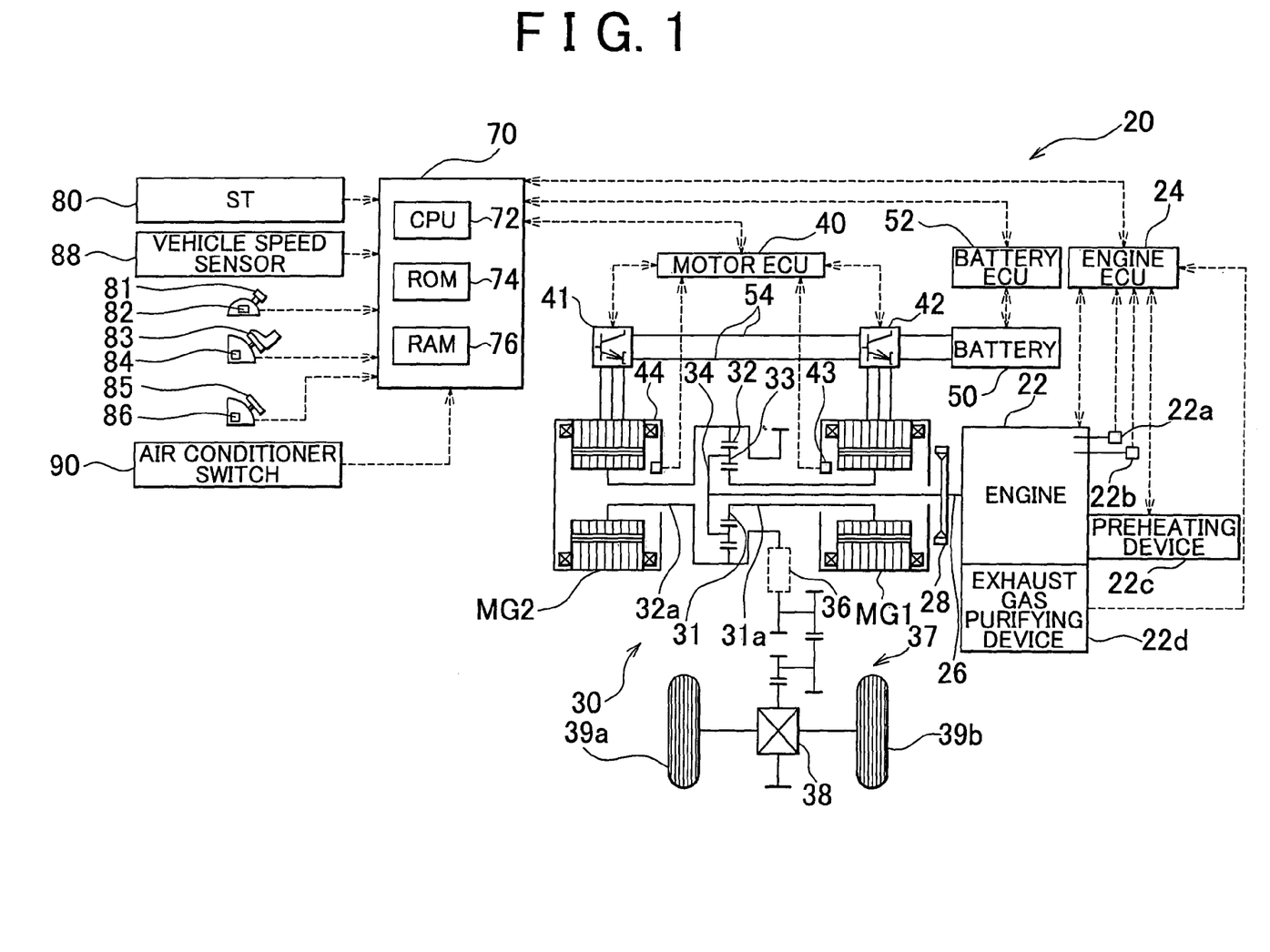
FIG. 1 is a view schematically showing a configuration of a hybrid vehicle according to a first embodiment of the invention.

Next, an embodiment according to the invention will be described with reference to accompanying drawings. FIG. 1 is a view schematically showing a configuration of a hybrid vehicle 20 according to a first embodiment of the invention. As shown in FIG. 1, the hybrid vehicle 20 according to the embodiment includes an engine 22, a three-shaft power distributing/integrating mechanism 30 which is connected to a crankshaft 26 as an output shaft of the engine 22 through a damper 28, a motor MG1 which is connected to the power distributing/integrating mechanism 30 and which can generate electric power, a motor MG2 which is connected to the power distributing/integrating mechanism 30, and an electronic control unit 70 for a hybrid vehicle (hereinafter, referred to as an "ECU 70") which controls an entire driving system of the vehicle.

The engine 22 is an internal combustion engine which outputs power using hydrocarbon fuel such as gasoline and gas oil. Operation control of the engine 22, such as fuel injection control, ignition control, intake air amount adjusting control is performed by an electronic control unit 24 for an engine (hereinafter, referred to as an "engine ECU 24") which inputs signals transmitted from various sensors for detecting an operation state of the engine 22. The various sensors include a temperature sensor 22a which detects a temperature Tw of coolant for the engine 22 (hereinafter, referred to as an "engine coolant temperature Tw"), and an air-fuel ratio sensor 22b which detects an intake air amount and an air-fuel ratio (A/F). The engine 22 includes a preheating device 22c, and an exhaust gas purifying device 22d. The preheating device 22c stores part of the coolant, whose temperature becomes high during operation, in a tank (not shown) whose adiathermancy is high, and preheats a cylinder and a head of the engine 22 using the coolant whose temperature is maintained at a predetermined temperature in the tank. The exhaust gas purifying device 22d purifies the exhaust gas using the effect of a catalyst. The engine ECU 24 controls the preheating device 22c and the exhaust gas purifying device 22d. The engine ECU 24 communicates with the ECU 70, controls the operation of the engine 22 according to a control signal transmitted from the ECU 70, and outputs data concerning the operation state of the engine 22 to the ECU 70 as necessary.

The power distributing/integrating mechanism 30 includes a sun gear 31 formed of an external gear, a ring gear 32 formed of an internal gear provided concentrically with the sun gear 31, a plurality of pinion gears 33 engaged with a sun gear 31 and the ring gear 32, a carrier 34 which holds a plurality of the pinion gears 33 such that the pinion gears 33 can rotate and revolve. The power distributing/integrating mechanism 30 is formed as a planetary gear mechanism which performs differential action using the sun gear 31, the ring gear 32 and the carrier 34 as rotational means. In the power distributing/integrating mechanism 30, the crankshaft 26 of the engine 22 is coupled with the carrier 34, the motor MG1 is coupled with the sun gear 31, and the motor MG2 is coupled with the ring gear 32. When the motor MG1 functions as a power generator, the power from the engine 22, which is input from the carrier 34, is distributed to a sun gear 31 side and a ring gear side 32 according to a gear ratio therebetween. When the motor MG1 functions as a motor, the power from the engine 22, which is input from the carrier 34, and the power from the motor MG1, which is input from the sun gear 31, are integrated and then output to the ring gear 32. The ring gear 32 is mechanically connected to front driving wheels 39a, 39b through a belt 36, a gear mechanism 37, and a differential gear 38. Accordingly, the power output to the ring gear 32 is output to the driving wheels 39a, 39b through the belt 36, the gear mechanism 37, and the differential gear 38. The three shafts connected to the power distributing/integrating mechanism 30 as a driving system are the crankshaft 26 which is an output shaft of the engine 22 and is connected to the carrier 34, a sun gear shaft 31a which is connected to the sun gear 31 so as to serve as a rotational shaft of the motor MG1, and a ring gear shaft 32a which is a driving shaft connected to the ring gear 32 and is mechanically connected to the driving wheels 39a, 39b.

Each of the motors MG1, MG2 is formed as a known synchronous generator-motor which can function as a power generator and as a motor. The motors MG1, MG2 exchange electric power with a battery 50 through inverters 41, 42. An electric line 54, which connects the inverters 41, 42 to the battery 50, is formed as a positive bus and a negative bus shared by the inverters 41, 42. The electric power generated by one of the motors MG1, MG2 can be consumed by the other motor. The battery 50 is provided as an electric power storage device which can store and discharge electric power.

For example, the battery 50 can store the electric power generated by the motors MG1, MG2, and can discharge the electric power so as to compensate the deficiency of the electric power due to the driving of various electrical devices for performing various control of the hybrid vehicle. However, when the electric power is balanced between the motors MG1, MG2, the battery 50 is not charged or discharged. An electronic control unit 40 for a motor (hereinafter, referred to as a "motor ECU 40") controls the driving of the motors MG1, MG2. Signals necessary for controlling the driving of the motors MG1, MG2 are input into the motor ECU 40. The signals include signals from a rotational position detecting sensors 43, 44 which detect rotational positions of rotors of the motors MG1, MG2, a phase current applied to the motors MG1, MG2 which is detected by a current sensor (not shown). Switching control signals to the inverters 41, 42 are output from the motor ECU 40. The motor ECU 40 calculates a rotational speed Nm1 of a rotor of the motor MG1, and a rotational speed Nm2 of a rotor of the motor MG2 based on the signals input from the rotational position detecting sensors 43, 44 according to a rotational speed calculating routine (not shown). The rotational speeds Nm1, Nm2 are the rotational speeds of the sun gear 31a and the ring gear shaft 32a since the motor MG1 is connected to the sun gear 31 and the motor MG2 is connected to the ring gear 32. The motor ECU 40 communicates with the ECU 70, controls the driving of the motors MG1, MG2 according to a control signal from the ECU 70, and outputs data concerning the operation states of the motors MG1, MG2 to the ECU 70 as necessary.

An electronic control unit 52 for a battery (hereinafter, referred to as a "battery ECU 52") controls the battery 50. The battery ECU 52 receives signals necessary for controlling the battery 50, such as a signal indicative of a between-terminal voltage from a voltage sensor (not shown) provided between the terminals of the battery 50, a signal indicative of a charging/discharging current from a current sensor (not shown) provided on the electric line 54 connected to an output terminal of the battery 50, and a signal indicative of a temperature of the battery from a temperature sensor (not shown) provided on the battery 50. The battery ECU 52 outputs data concerning the state of the battery 50 to the ECU 70 as necessary. The battery ECU 52 computes a state of charge (herein after referred to as an "SOC") based on a value obtained by accumulating charging/discharging currents detected by the current sensor so as to control the battery 50.

The ECU 70 is formed as a microprocessor which mainly includes a CPU 72. The ECU 70 includes ROM 74 which stores a processing program, RAM 76 which temporarily stores data, an input/output port (not shown) and a communication port (not shown) in addition to the CPU 72. The ECU 70 receives a start signal for starting a vehicle from a start switch 80, a shift position SP from a shift position sensor 82 which detects an operation position of a shift lever 81, an accelerator opening Acc from an accelerator pedal position sensor 84 which detects an accelerator opening corresponding to a depressing amount of an accelerator pedal 83, a brake pedal position BP from a brake pedal position sensor 86 which detects a depressing amount of a brake pedal 85, a vehicle speed V from a speed sensor 88, a switch signal from an ON/OFF switch (hereinafter, referred to as an "air conditioner switch") 90 of an air-conditioning device such as an air conditioner, which performs air-conditioning in the vehicle compartment, and the like through the input/output port. As mentioned above, the ECU 70 is connected to the engine ECU 24, the motor ECU 40, and the battery ECU 52 through the communication port so as to exchange various control signals and data with the engine ECU 24, the motor ECU 40 and the battery ECU 52.

In the hybrid vehicle 20 according to the embodiment, a required torque Td* to be output to the ring gear shaft 32a as a driving shaft is calculated based on the accelerator opening Acc corresponding to the depressing amount of the accelerator pedal 83 and the vehicle speed V. Operation of the engine 22, the motor MG1, and the motor MG2 are controlled such that the required power P* corresponding to the required torque Td* is output to the ring gear shaft 32a. The operation control mode for the engine 22, the motor MG1, and the motor MG2 includes a torque conversion operation mode, a charge/discharge operation mode, and a motor operation mode. In the torque conversion operation mode, operation of the engine 22 is controlled such that power corresponding to the required power P* is output from the engine 22, and the driving of the motor MG1 and the motor MG2 is controlled such that torque of the entire power output from the engine 22 is converted by the power distributing/integrating mechanism 30, the motor MG1 and the motor MG2, and is then output to the ring gear shaft 32a. In the charge/discharge operation mode, operation of the engine 22 is controlled such that power corresponding to the sum of the required power P* and electric power necessary for the charge/discharge of the battery 50 is output from the engine 22, and driving of the motor MG1 and the MG2 is controlled such that charge/discharge of the battery 50 is performed, torque of the entire or part of power output from the engine 22 is converted by the power distributing/integrating mechanism 30, the motor MG1, and the motor MG2, and the required power P* is output to the ring gear shaft 32a. In the motor operation mode, operation of the vehicle is controlled such that the engine 22 is stopped and power corresponding to the required power P* from the motor MG2 is output to the ring gear shaft 32a.

Figure 2:
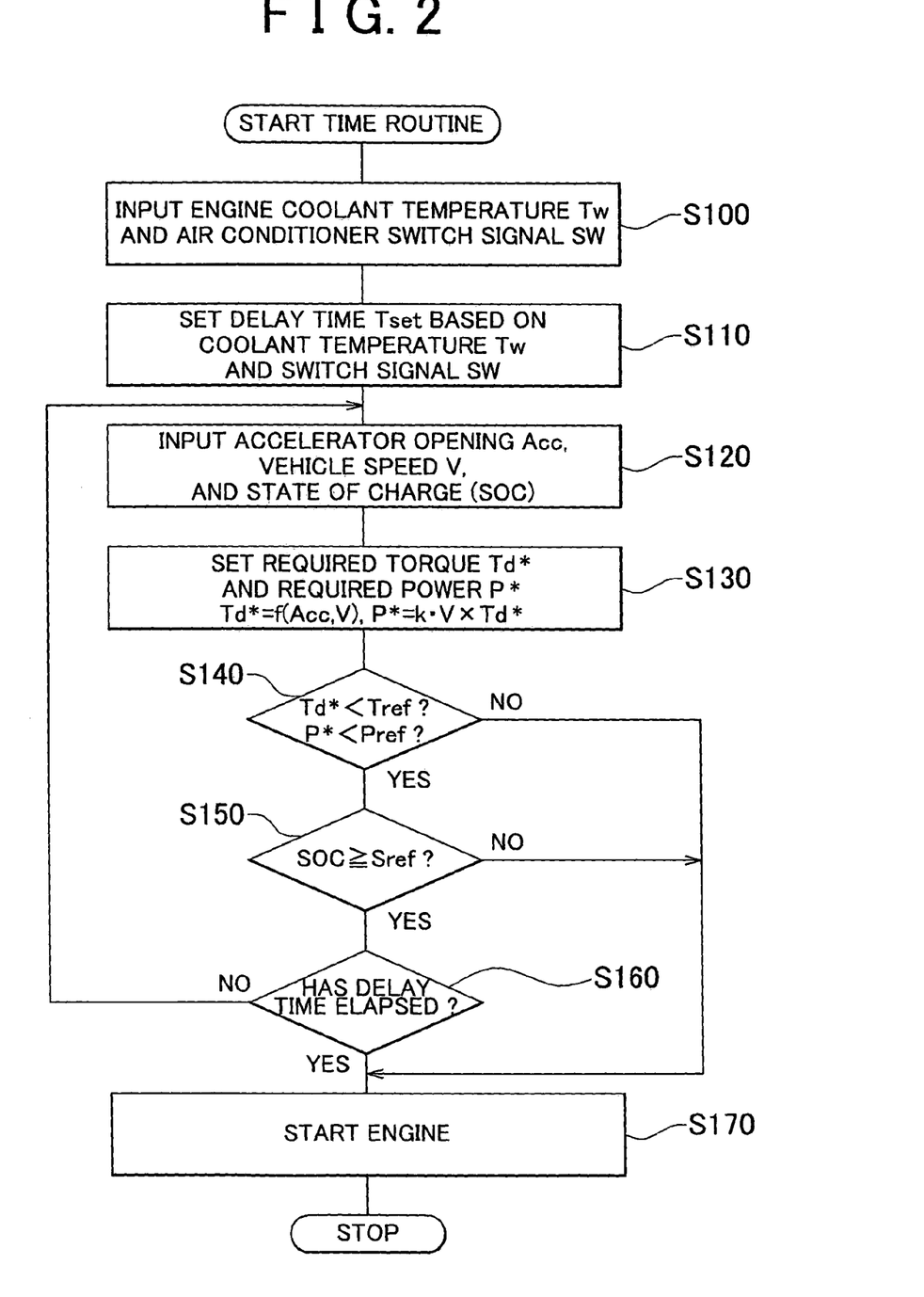
FIG. 2 is a flowchart showing an example of a start time routine performed by an electronic control unit for a hybrid vehicle in the first embodiment.

Next, operation of the hybrid vehicle 20 according to the embodiment of the invention will be described. Particularly operation of the hybrid vehicle 20 when the engine 22 is started for the first time after the start switch 80 is turned ON will be described. FIG. 2 is a flowchart showing an example of a start time routine performed by the ECU 70. The routine is performed when the start switch 80 is turned ON.

When the routine is started, the CPU 72 of the ECU 70 initially receives an engine coolant temperature Tw, and a switch signal SW from an air-conditioner switch 90 (step S100), and sets a delay time Tset based on the engine coolant temperature Tw and the switch signal SW (step S110). The engine coolant temperature Tw, which is detected by the temperature sensor 22a and is input in the engine ECU 24, can be input in the ECU 70 through communication with the engine ECU 24. In the embodiment, the delay time Tset is set according to a first delay time setting map shown in FIG. 3, when the switch signal SW is OFF. The first delay time setting map shows a relationship between the engine coolant temperature Tw and the delay time Tset. On the other hand, when the switch signal SW is ON, the delay time Tset is set according to a second delay time setting map shown in FIG. 4. The second delay time setting map shows a relationship between the engine coolant temperature Tw and the delay time Tset. As can be understood from the first delay time setting map in FIG. 3 and the second delay time setting map in FIG. 4, there is a tendency that when the engine coolant temperature Tw is low, the delay time Tset is short, and when the engine coolant temperature Tw is high, the delay time Tset is long. In the embodiment, the delay time is set to a predetermined time in a normal time. When the switch signal SW is OFF, a state in which the temperature Tw is Tw2 to Tw5 is regarded as a normal state. When the switch signal is ON, a state in which the temperature Tw is Tw4 to Tw5 is regarded as a normal state. The predetermined time Ts1 is set based on a time necessary for completing preheating of the engine 22 by the preheating device 22c, a time necessary for completing preparations of the sensors such as an air-fuel ratio sensor 22b such that they function properly, a warming-up time necessary for increasing a temperature of a catalyst of the exhaust gas purifying device 22d to a temperature at which the purifying device 22 is activated, and the like. In the embodiment, the predetermined time Ts1 is a time necessary for completing all these preparations (for example, 20 seconds). The engine coolant temperature Tw is used as a parameter when setting the delay time Tset. This is because the delay time Tset can be set to the time based on the state of the engine 22 and the outside air temperature, since the engine coolant temperature Tw depends on the time which has elapsed since the operation of the engine 22 is stopped and the outside air temperature. Significance of the setting maps and the delay time Tset in FIGS. 3, 4 will be described later in more detail.

Figure 5:
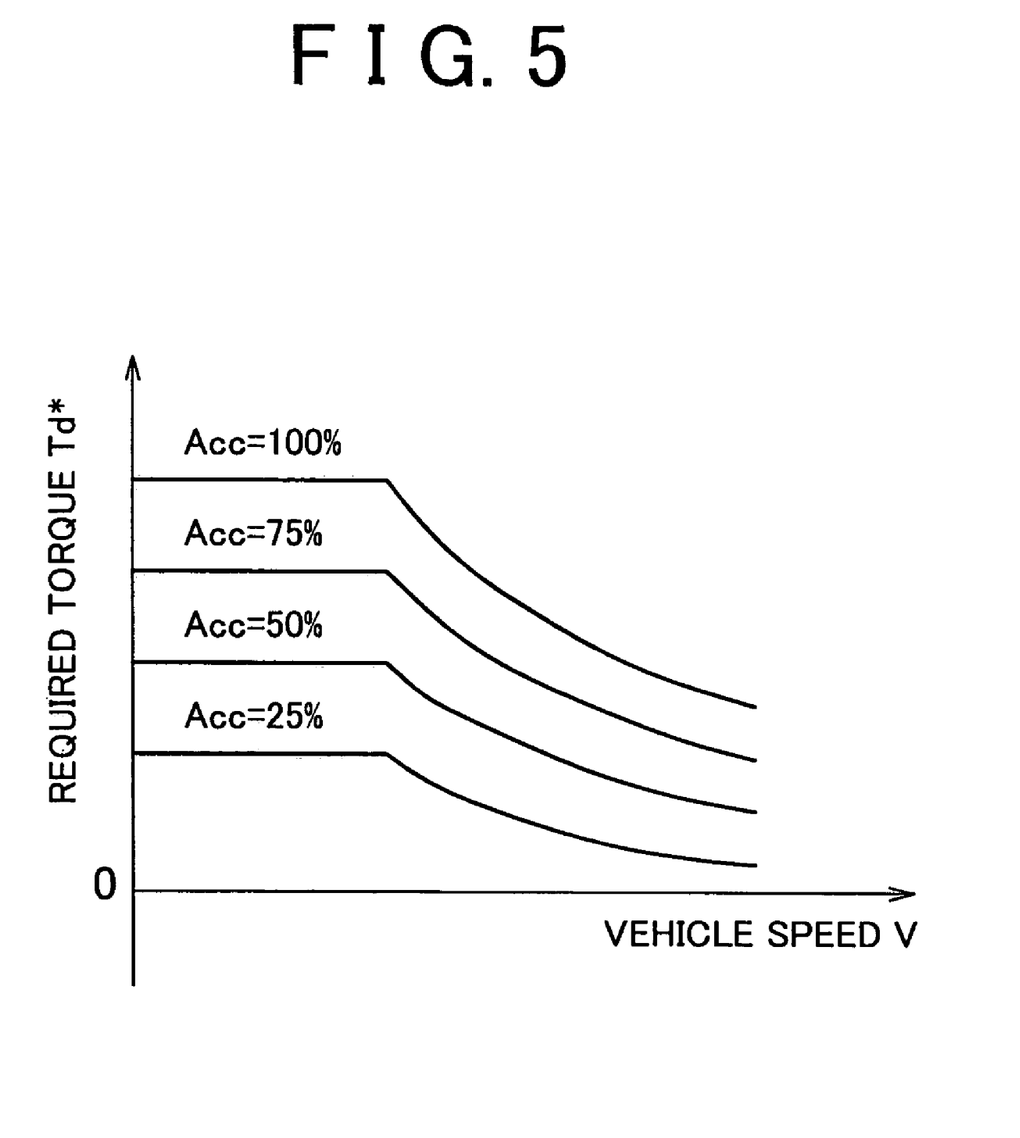
FIG. 5 is a graph showing an example of a required torque setting map.

When the delay time Tset is thus set, an accelerator opening Acc from the accelerator pedal position sensor 84, a vehicle speed V from the vehicle speed sensor 88, and a SOC of the battery 50 which is computed and controlled by the battery ECU 52 are received by the ECU 70 (step S120). The required torque Td* and the required power P* which are required by the ring gear shaft 32a based on the accelerator opening Acc and the vehicle speed V are set (step S130). In the embodiment, the required torque Td* is set in the following method. A relationship among the accelerator opening Acc, the vehicle speed V, and the required torque Td* is set in advance and is stored in ROM 74 as a required torque setting map. When the accelerator opening Acc and the vehicle speed V are provided, the corresponding required torque Td* is derived from the map. FIG. 5 shows an example of the required torque setting map. The required power P* can be obtained by multiplying the required torque Td* by the rotational speed (which can be obtained by multiplying the vehicle speed V by a coefficient k) of the ring gear shaft 32a.

When the required torque Td* and the required power P*, which are to be output to the ring gear shaft 32a are set, the required torque Td* is compared with a threshold value Tref (a first threshold value), and the required power P* is compared with a threshold value Pref (a second threshold value) (step S140). Then the SOC of the battery 50 is compared with a threshold value Sref (a third threshold value) (step S150). The threshold value Tref is set to the torque which can be obtained in the motor operation when the vehicle runs using only the motor MG2. The threshold value Pref is set to the power which can be obtained in the motor operation mode. The threshold value Tref and the threshold value Pref are determined based on a rated value of the motor MG2 and efficiency of the engine 22. The threshold value Sref is set to a lower limit, which can be controlled as the SOC of the battery 50, or a value higher than the lower limit. Accordingly, as a result of a comparison between the required torque Td* and the threshold value Tref, and the comparison between the required power P* and the threshold value Pref, when it is determined that the required torque Td* is equal to or larger than the threshold value Tref or that the required power P* is equal to or larger than the threshold value Pref, the required torque Tref* exceeds the torque or the required power P* exceeds the power which can be obtained in the motor operation mode.

Therefore, in this case, the motor operation mode cannot be performed. On the other hand, when it is determined that the required torque Td* is smaller than the threshold value Tref and the required power P* is smaller than the threshold value Pref, the motor operation mode can be performed. As a result of the comparison of the SOC of the battery 50 with the threshold value Sref, when it is determined that the SOC of the battery 50 is equal to or larger than the threshold value Sref, electric power can be obtained from the battery 50, that is, the motor operation mode can be performed. On the other hand, when the SOC is smaller than the threshold value Sref, electric power cannot be obtained from the battery 50, that is, the motor operation mode cannot be performed.

When it is determined that the motor operation mode cannot be performed based on the required torque Td*, the required power P* and the SOC, that is, when the required torque Td* is equal to or larger than the threshold value Tref, when the required power P* is equal to or larger than the threshold value Pref, or when the SOC is smaller than the threshold value Sref, the engine 22 is started immediately (step S170), after which the routine ends. The hybrid vehicle 20 runs in the torque conversion operation mode, in which the engine 22 is started and the required torque Td* and the required power P* are output to the ring gear shaft 32a using power from the engine 22, or in the charge/discharge operation mode.

On the other hand, when it is determined that the motor operation mode can be performed based on the required torque Td*, the required power P* and the SOC, that is, when the required torque Td* is smaller than the threshold value Tref, the required power P* is smaller than the threshold value Pref, and the SOC is equal to or larger than the threshold value Sref, it is determined whether the delay time Tset set in step S110 has elapsed since the routine is started (step S160). When it is determined that the delay time Tset has not elapsed, the process is returned to step S120, steps S120 to S160 are repeated, and the engine 22 is started after the delay time Tset has elapsed (step S170), after which the routine ends. As mentioned above, the delay time Tset is set to the predetermined time Ts1 in a normal state. Therefore, when the delay time Tset has elapsed, preheating of the engine 22 by the preheating device 22c, preparations of sensors such as the air-fuel ratio sensor 22b, and warming-up of the exhaust gas purifying device 22d have been completed. Accordingly, by starting the engine 22 after the delay time Tset has elapsed, it is possible to efficiently perform the start of the engine 22 and the operation immediately after the engine start, and to appropriately purify the exhaust gas.

Figure 3:
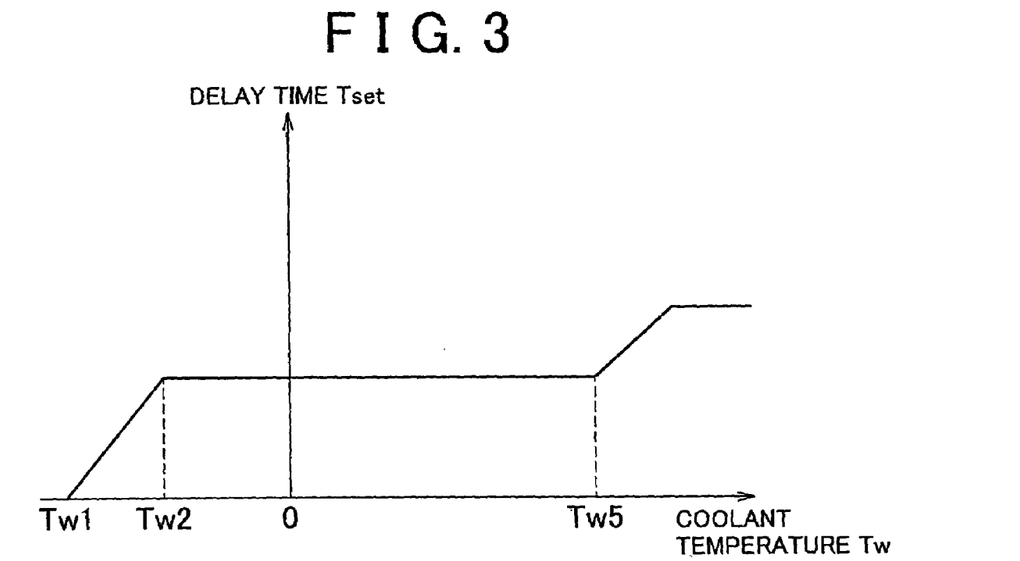
FIG. 3 is a graph showing an example of a first delay time setting map.
Figure 4:
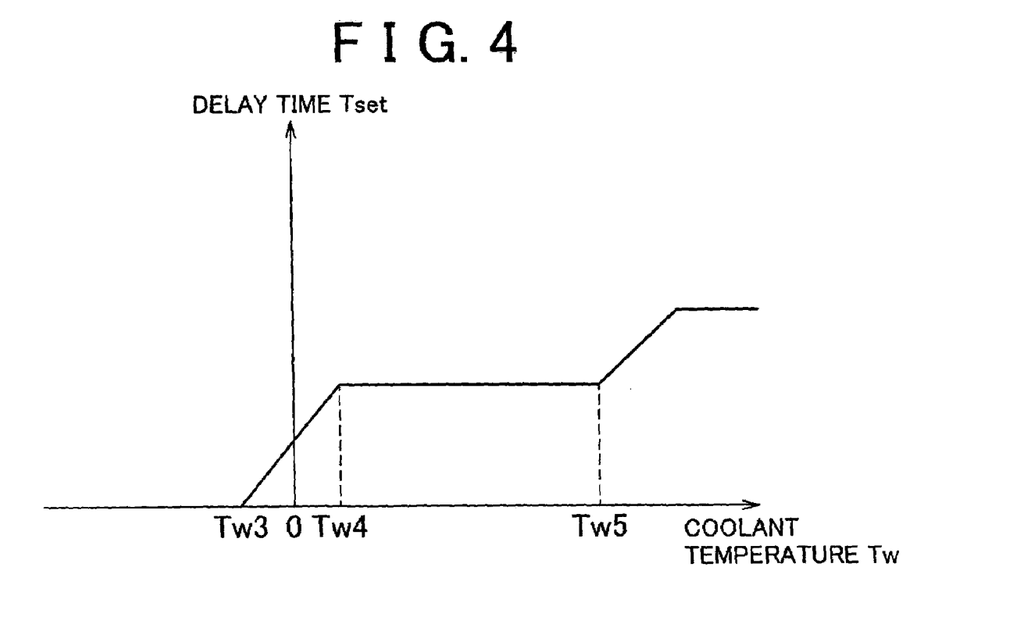
FIG. 4 is a graph showing an example of a second delay time setting map.

The delay time Tset is set so as to achieve the above-mentioned objects. As shown in the setting maps in FIGS. 3, 4, when the engine coolant temperature Tw is low (the temperature lower than the temperature Tw2 in FIG. 3, the temperature lower than the temperature Tw4 in FIG. 4), the performance of the battery 50 deteriorates. Accordingly, the delay time Tset is set to a short time or a value 0. The engine 22 is started before the preheating of the engine 22 by the preheating device 22c, preparations of the sensors such as the air-fuel ratio sensor 22b, and warming-up of the exhaust gas purifying device 22d are completed. Thus, the required torque Td* and the required power P* are reliably output. When the switch signal SW of the air conditioner switch 90 is ON, electric power necessary for the air conditioner in addition to the electric power necessary for the running by the motor is supplied from the battery 50. The delay time is set to a time which is shorter than in the normal state when the temperature is equal to or lower than the temperature Tw4 in FIG. 4. The temperature TW4 is higher than the temperature TW2 in FIG. 3 showing the case where the switch signal SW of the air conditioned switch 90 is OFF. Thus, the electric power necessary for the air conditioner in addition to the required torque Td* and the required power P* which are necessary for running is reliably obtained. When the engine coolant temperature Tw is equal to or higher than the temperature Tw5, deterioration in the performance of the battery 50 due to the engine coolant temperature does not occur. Therefore, the delay time Tset can be set to a time, which is longer than the predetermined time Ts1 necessary for completing preheating of the engine 22 by the preheating device 22c, preparations of the sensors such as the air-fuel ratio sensor 22b, warming-up of the exhaust gas purifying device 22d. The delay time Tset can be determined based on the weight of the vehicle, the capacity of the battery 50, the ability of the motor MG2, and the like.

When the accelerator pedal 83 is deeply depressed, or the SOC of the battery 50 is reduced while the aforementioned steps are repeated, it may be determined that the motor operation mode cannot be performed based on the required torque Td*, the required power P*, and the SOC. In this case, the engine 22 is started immediately (step S170), after which the routine ends.

According to the hybrid vehicle 20 in the embodiment, in the case where the motor operation mode can be performed even if the start switch 80 is turned ON, when the engine coolant temperature Tw is in the normal state, the engine 22 is started after the delay time Tset, which is set to the predetermined time Ts1, has elapsed. The predetermined time Ts1 is a time necessary for completing the preheating of the engine 22 by the preheating device 22c, preparations of the sensors such as the air-fuel ratio sensor 22b, and warming-up of the exhaust gas purifying device 22d. Accordingly, it is possible to efficiently perform the start of the engine 22, and the operation of the engine 22 immediately after the engine start, and to appropriately purify the exhaust gas. In addition, it is necessary only to determine whether the delay time Tset has elapsed. It is not necessary to determine whether the preheating of the engine 22 by the preheating device 22c has been completed, whether the preparation of the sensors such as the air-fuel ratio sensor 22b has been completed, and whether the warming-up of the exhaust gas purifying device 22d has been completed, separately. Accordingly, it is possible to make the start time control simple, compared with when the engine 22 is started after the above-mentioned determinations are made separately. When it is determined that the motor operation mode cannot be performed based on the required torque Td*, the required power P*, and the SOC, the engine 22 can be immediately started.

In the hybrid vehicle 20 according to the embodiment, the delay time Tset is set to the predetermined time Ts1 in the normal state. The predetermined time Ts1 is a time necessary for completing preheating of the engine 22 by the preheating device 22c, the preparations of the sensors such as the air-fuel ratio sensor 22b, and warming-up of the exhaust gas purifying device 22d. However, the predetermined time Ts1 may be determined based on the completion of the preparations of the other devices used for the start and the operation of the engine 22, and the delay time Tset may be set to the predetermined time Ts1 t.

In the hybrid vehicle 20 according to the embodiment, when the start switch 80 is turned ON and it is determined that the motor operation mode can be performed based on the required torque Td*, the required power P* and the SOC, steps S120 to S160 are repeatedly performed until the delay time Tset elapses. When the SOC of the battery 50 becomes smaller than the threshold value Sref while the aforementioned steps are performed, the engine 22 is immediately started. However, when the SOC of the battery 50 immediately after the start of the routine is equal to or larger than the predetermined value, the engine 22 need not be started until the delay time Tset elapses regardless of the subsequent SOC.

In the hybrid vehicle 20 according to the embodiment, when the start switch 80 is turned ON and it is determined that the motor operation mode can be performed based on the required torque Td*, the required power P* and the SOC, the engine 22 is started immediately after the delay time Tset has elapsed. However, the engine 22 may be started anytime as long as the delay time Tset has elapsed.

In the hybrid vehicle 20 according to the embodiment, the engine 22 is started after the start switch 80 is turned ON and after it is determined whether the motor operation mode can be performed based on the SOC of the battery 50 in addition to the required torque Td* and the required power P*. However, the engine 22 may be started after it is determined whether the motor operation mode can be performed based on not only the SOC of the battery 50 but also other requirements necessary for performing the motor operation mode such as the state of the inverter 41.

Figure 6:
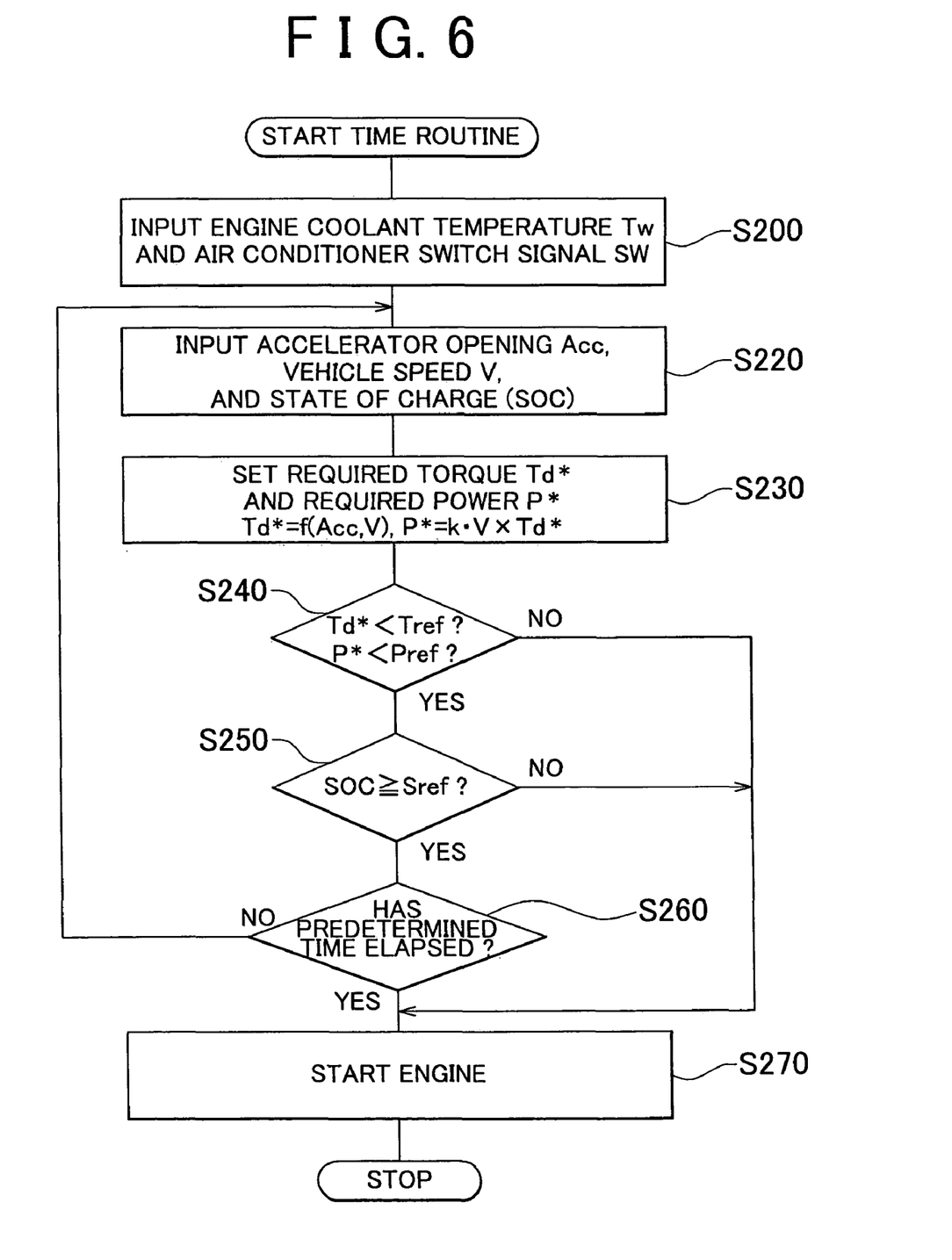
FIG. 6 is a flowchart showing an example of a start time routine according to a second embodiment.

In the hybrid vehicle 20 according to the embodiment, when the start switch 80 is turned ON and it is determined that the motor operation mode can be performed based on the required torque Td*, the required power P* and the SOC, the engine 22 is started immediately after the delay time Tset has elapsed. However, the engine 22 may be started after the predetermined time Ts1 has elapsed. In this case, the start time routine shown in FIG. 6 need to be performed instead of the start time routine shown in FIG. 2. In the start time routine in FIG. 6, as can be understood by comparing it with the start time routine in FIG. 2, the delay control time Tset is not set in step S110, and a determination is made as to whether the predetermined time Ts1 has elapsed instead of the determination in step S160 as to whether the delay time has elapsed (step S260). When it is determined that the operation mode can be performed based on the required torque Td*, the required power P*, and the SOC, the engine 22 is started after the predetermined time Ts1 has elapsed at all times. Accordingly, it is possible to reduce the driver's discomfort due to a change in timing of starting the engine 22 after the start switch 80 is turned ON.

Figure 7:
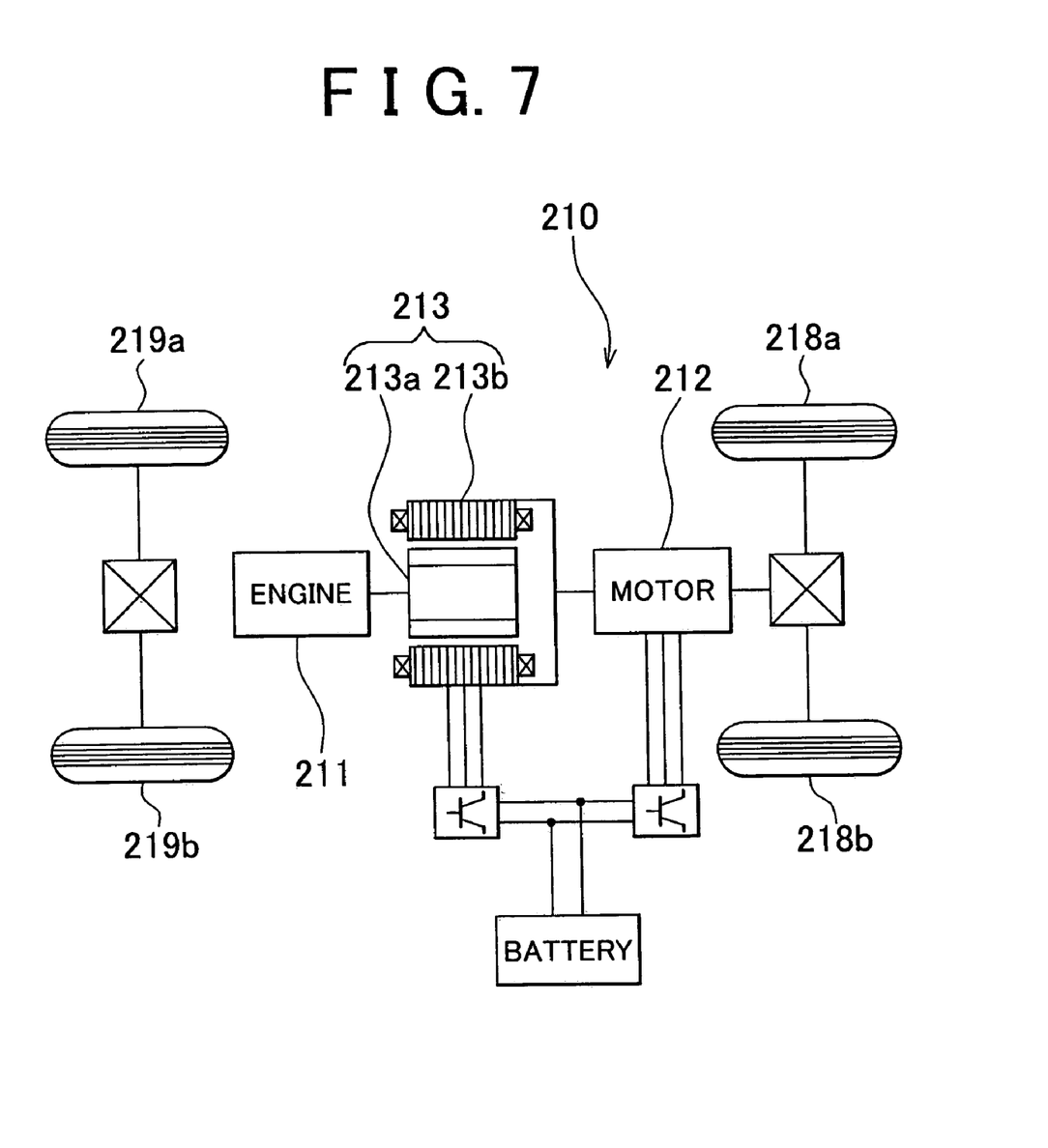
FIG. 7 is a view schematically showing a configuration of a hybrid vehicle according to the second embodiment.

In the embodiment, the control, which is performed when the engine is started for the first time after the start switch is turned ON, is applied to the hybrid vehicle 20 including the engine 22, the power distributing/integrating mechanism 30, the motor MG1, and the motor MG2. However, in a second embodiment, for example, as shown in FIG. 7, the control can be applied to a so-called electric power distribution type hybrid vehicle 210. The electric power distribution type hybrid vehicle 210 includes a motor 213 which has an inner rotor 213*a* connected to an output shaft of an engine 211 and an outer rotor 213*b* provided on a driving shaft connected to driving wheels 219*a*, 218*b*, and which relatively rotates by an electromagnetic action of the inner rotor 213*a* and the outer rotor 213*b*, and a motor 212 which is mechanically connected to a driving shaft so as to be able to directly output the power to the driving shaft. Also, the control can be applied to any types of hybrid vehicles as long as the vehicle includes an internal combustion engine and a motor which enable the vehicle to run using only the motor.

While the invention has been described in detail with reference to the preferred embodiments, it will be apparent to those skilled in the art that the invention is not limited to the above-mentioned embodiments, and that the invention may be realized in various other embodiments within the scope of the invention.

What is claimed is:

1. A hybrid vehicle, comprising:
   an internal combustion engine;
   a motor which can output power to a driving shaft coupled with an axle;
   an electric power storage device which can store electric power obtained by converting at least part of power from the internal combustion engine to electric power, and which can supply the electric power to the motor;
   a required driving force setting controller which sets a required driving force required for running according to an operation by a driver; and
   a start time controller which starts the internal combustion engine for a first time after a predetermined time has elapsed since an instruction for starting the hybrid vehicle is given in a case where the required driving force set by the required driving force setting controller is equal to or smaller than a predetermined driving force and the vehicle can run using only the motor,
   wherein a timer measures the predetermined time which has elapsed.

2. The hybrid vehicle according to claim 1, wherein an amount of electric power stored in the electric power storage device is equal to or larger than a predetermined value when the vehicle can run using only the motor.

3. The hybrid vehicle according to claim 1, further comprising:
   a temperature detecting controller which detects a temperature of coolant for the internal combustion engine; and
   a delay time setting controller which sets a delay time by which start of the internal combustion engine is delayed based on the detected temperature, wherein the start time controller starts the internal combustion engine using the delay time set by the delay time setting controller as the predetermined time.

4. The hybrid vehicle according to claim 3, wherein the delay time setting controller sets a delay time to be shorter as the detected temperature is lower.

5. The hybrid vehicle according to claim 3, wherein the delay time setting controller sets the delay time based on a driving state of an air-conditioning device provided in a vehicle compartment.

6. The hybrid vehicle according to claim 1, wherein the start time controller starts the internal combustion engine when the predetermined time has elapsed since the instruction for starting the vehicle is given.

7. The hybrid vehicle according to claim 1, wherein the predetermined time is longer than a preparation time necessary for completing a preparation of a sensor used for operation of the internal combustion engine such that the sensor functions properly.

8. The hybrid vehicle according to claim 1, further comprising:
   a preheating controller which stores heat generated by the internal combustion engine during operation, and which preheats the internal combustion engine using the stored heat when the internal combustion engine is started, wherein the predetermined time is longer than a time necessary for completing preheating of the internal combustion engine by the preheating controller.

9. The hybrid vehicle according to claim 1, wherein the internal combustion engine is connected to the driving shaft so as to be able to output power to the driving shaft.

10. A hybrid vehicle, comprising:

an internal combustion engine;

a motor which can output power to a driving shaft coupled with an axle;

electric power storage means for storing electric power obtained by converting at least part of power from the internal combustion engine to electric power, and for supplying the electric power to the motor;

required driving force setting means for setting a required driving force that is required for running based on an operation by a driver; and start time control means for starting the internal combustion engine for a first time after a predetermined time has elapsed since an instruction for starting the hybrid vehicle is given in a case where the required driving force set by the required driving force setting controller is equal to or smaller than a predetermined driving force and the vehicle can run using only the motor, wherein a timer measures the predetermined time which has elapsed.

* * * * *